E. E. ELLMANN.
NUT LOCK.
APPLICATION FILED SEPT. 27, 1915.
1,210,919.
Patented Jan. 2, 1917.
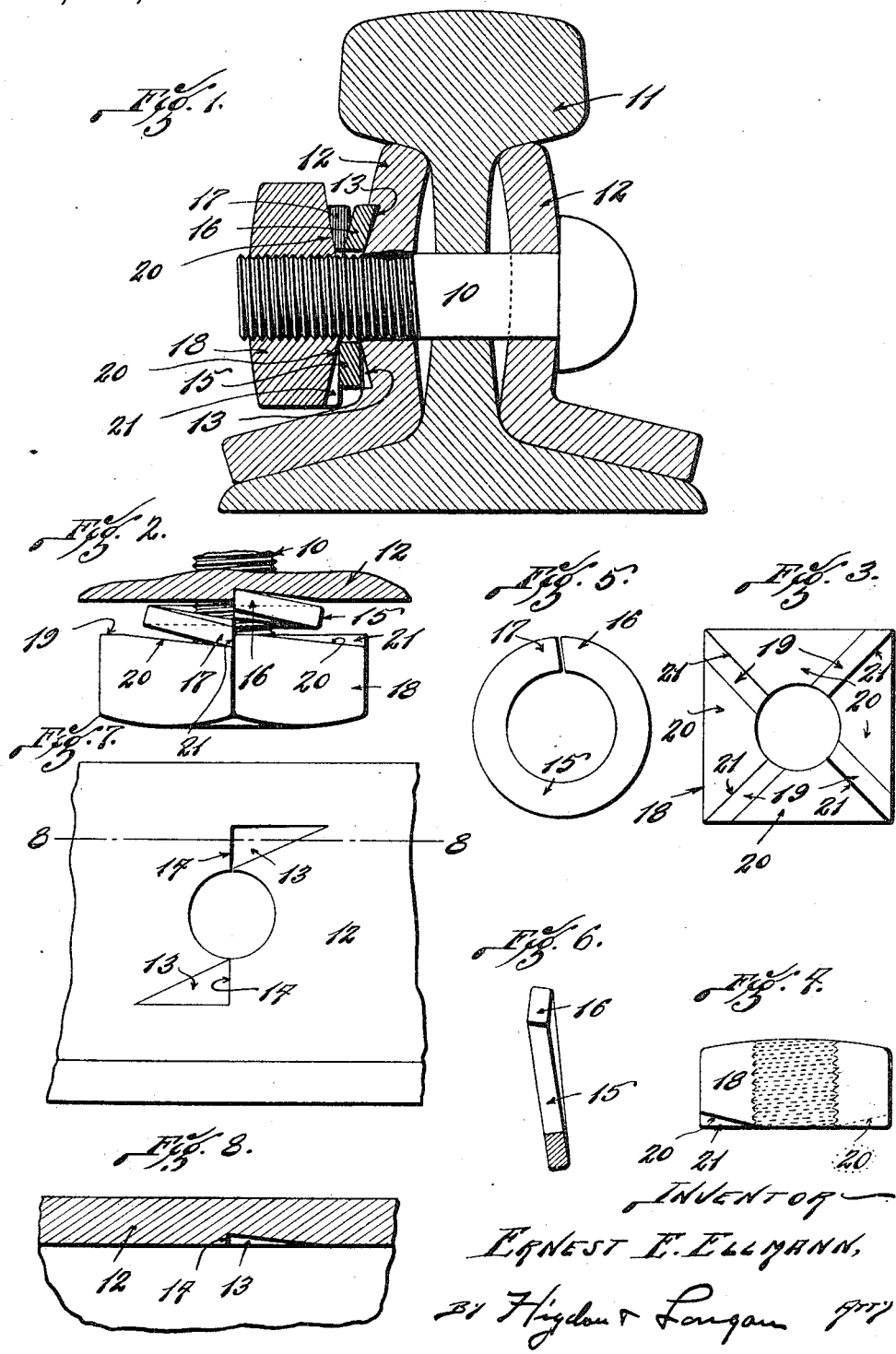
INVENTOR
ERNEST E. ELLMANN,
BY Higdon & Longan ATT'YS.

UNITED STATES PATENT OFFICE.

ERNEST E. ELLMANN, OF ST. LOUIS, MISSOURI.

NUT-LOCK.

1,210,919.  Specification of Letters Patent.  Patented Jan. 2, 1917.

Application filed September 27, 1915. Serial No. 52,948.

*To all whom it may concern:*

Be it known that I, ERNEST E. ELLMANN, a citizen of the United States, and resident of St. Louis, Missouri, have invented certain new and useful Improvements in Nut-Locks, of which the following is a specification containing a full, clear, and exact description, reference being had to the accompanying drawings, forming a part hereof.

My invention relates to improvements in nut locks and the object of my improvements is to construct a nut as well as a plate to be placed against the work, each provided with a face terminating in a shoulder, which faces and shoulders incline relative to the faces of the nut and plate, and to be used in connection with a spring washer of spiral formation whose free ends incline relative to a line drawn at right angles to its axis, whereby when in use said faces and shoulders of the nut and plate will engage the full width of the ends of the washer.

With the above and other objects in view, my invention consists in certain details of construction and arrangement of parts hereinafter fully described, pointed out in my claims, and illustrated by the accompanying drawing, in which—

Figure 1 is a sectional elevation showing an embodiment of my invention as applied to a rail joint. Fig. 2 is a fragmental sectional plan showing the spring-washer ends in engagement with the nut and plate. Fig. 3 is a face view of the nut. Fig. 4 is an elevation of the nut. Fig. 5 is a face view of the washer. Fig. 6 is a sectional elevation of the washer showing its spiral formation and the inclination of the washer end. Fig. 7 is a face view of a fish plate, and Fig. 8 is a fragmental sectional plan of the fish plate taken on the line 8—8 of the Fig. 7.

Referring by numerals to the accompanying drawing, 10 designates a bolt, 11 a rail, and 12 a fish plate, all of which in their specific constructions are common, and form no part of my invention.

In the one fish plate 12 as shown by Figs. 1, 2, 7, and 8 I form in its outer face contiguous to the bolt hole through the fish plate, one or more depressions 13, which depressions incline in two directions, the one direction being toward the body of the plate in a direction from right to left and in a direction leading from the bolt hole outwardly therefrom and into the body of the plate. The first inclination referred to being clearly shown in Figs. 2 and 8 and the second inclination being clearly shown in Fig. 1. Each of these depressions forms a shoulder 14, which graduates in depth from the plane of the plate at the bolt hole to maximum depth at the opposite side of the depression.

The numeral 15 designates a spring washer which is of substantially spiral formation, and whose ends 16 and 17 incline in opposite directions relative to each other, that is stand at different angles with relation to a line drawn perpendicular to the axis of the washer.

The numeral 18 designates a nut which is of ordinary construction except for its face which coöperates with the washer. By reference to Fig. 3 it will be noted that this face of the nut comprises a number of plane facets 19, preferably in radial arrangement relative to the threaded bore. Between each of the facets, the said face of the nut is provided with plane surfaces 20 which as clearly shown in Fig. 4 incline from the bore toward the body of the nut. In other words the faces 20 chamfer the nut giving it greater axial dimensions at the bore than at its outer edges and as shown in Fig. 2 these faces 20 also incline between the said facets 19, which faces extend to the plane of one facet and from thence receding to a point beneath the next facet thereby forming the shoulders 21, which as shown in Fig. 2 have greater depths adjacent the edge of the nut to conform to the inclination of the free ends of the washer whereby said washer ends will engage throughout their widths with said shoulders.

I am aware that heretofore spring washers have been employed for the purpose of locking nuts against retrograde movement when seated, and that nuts have been employed with shoulders to co-act with the washers to prevent movements of the nuts, but in all such former nuts that I have familiarized myself with, the shoulders were of uniform depth and for this reason engage only the "biting" corner of the spring washer end. By the employment of my improved nut and plate it is apparent that the washer ends engage throughout their entire widths the shoulders on the nuts and plates, and hence have much greater strength and holding capacity than all nuts of the prior art.

The plane facets 19 serve the double function of lending rigidity or backing to the shoulders 21 as well as providing faces rather than sharp edges at the shoulders to permit the use of the nut without the spring washers, that is to permit the nut to be rotated relative to the work without defacing the face of the work.

Having thus described my invention what I claim as new therein and desire to secure by Letters Patent of the United States therefor is:—

1. A nut lock comprising in combination a threaded bolt, a plate having a graduate shoulder extended from the plane of the face of the plate into the body of the plate and an inclined surface next to the shoulder which inclines first in a direction from the base of said shoulder to a point removed therefrom at the plane of the face of the plate, and second in a direction from the plane of the face of the plate next the bolt at an angle to a line perpendicular to the bolt, a nut whose one face comprises a number of shoulders and surfaces as just recited in the plate, and a spirally formed spring washer whose free ends incline in opposite direction to each other for engagement with the shoulders of said plate and nut.

2. In combination with a washer of spiral formation and having free ends each standing at an angle relative to a line perpendicular to the axis of the washer, a plate and a nut each having a depression formed in their faces next said washer forming shoulders which incline at the same angle as the free ends of said washer whereby said free washer ends will engage throughout their lengths said shoulders.

In testimony whereof, I have signed my name to this specification, in presence of two subscribing witnesses.

ERNEST E. ELLMANN.

Witnesses:
R. G. ORWIG,
A. S. KILRIRTZ.

Copies of this patent may be obtained for five cents each, by addressing the "Commissioner of Patents, Washington, D. C."